United States Patent [19]

Schaap et al.

[11] 4,222,037

[45] Sep. 9, 1980

[54] COOKING CYCLE TIMER

[75] Inventors: David J. Schaap, South Holland, Ill.;
Donald L. Watrous, Liverpool, N.Y.

[73] Assignee: General Electric Company, Carmel, Ind.

[21] Appl. No.: 966,629

[22] Filed: Dec. 5, 1978

[51] Int. Cl.² .............................................. G08B 5/00
[52] U.S. Cl. ................... 340/309.1; 307/141; 340/309.4
[58] Field of Search ............. 307/141.4, 141.8, 141; 340/309.1, 309.4

[56] References Cited

U.S. PATENT DOCUMENTS

| | | | |
|---|---|---|---|
| 3,819,906 | 6/1974 | Gould | 307/141 |
| 4,020,358 | 8/1977 | Wyland | 307/141 |
| 4,110,632 | 8/1978 | Wyland | 307/141 |
| 4,134,027 | 1/1979 | Scott | 307/141 |
| 4,137,463 | 1/1979 | Sott | 307/141 |

Primary Examiner—Harold I. Pitts
Attorney, Agent, or Firm—Arthur E. Bahr

[57] ABSTRACT

A cooking cycle timer includes two timing circuits, each incorporating an oscillator and a counter. The first timing circuit times the first portion of a cooking cycle, and the second timing circuit times a predetermined second portion. At the end of the first portion, a visible indicator is turned on to indicate that the predetermined second portion of time remains in the cooking cycle. At the end of the second portion, and thereby the end of the cooking cycle, the visible indicator and an audible indicator are operated in pulsed fashion through the operation of a third oscillator. Visible indication is also provided during the first portion of the cooking cycle to show that the timing circuit is active.

2 Claims, 3 Drawing Figures

COOKING CYCLE TIMER

BACKGROUND OF THE INVENTION

1. Field of the Invention

The present invention relates to an improved electrical cooking cycle timer and more particularly, to such a cooking cycle timer having means for providing the operator with an indication that a predetermined period of time remains in the cooking cycle.

2. Description of the Prior Art

Many timer applications are intended to free the timer operator to perform other tasks while the timed task is taking place. During the timed task, the operator begins and completes several, less time-consuming tasks. In order to help the operator better manage his time, it would be desirable to know when the timed task is nearing completion.

A typical conventional cooking timer provides the operator with an indication that the end of cycle has occurred. Furthermore, such a typical timer utilizes a mechanical escapement or the one-time charging of a large capacitor with a very minute current to time a prescribed cooking cycle. It would be desirable to provide a timer which incorporates an oscillator and a counter for determining the prescribed length of the cooking cycle. The use of an oscillator would allow for more precise control of the capacitor charging current.

It is therefore, an object of the present invention to provide an electrical cooking cycle timer which includes means for giving the operator an indication when a predetermined period of time remains in the cooking cycle. It is a further object of the present invention to provide such a cooking cycle timer wherein an oscillator and a counter are included for determining the prescribed length of the cooking cycle.

SUMMARY OF THE INVENTION

In accordance with the present invention, there is provided an electrical circuit for timing a cycle for cooking a comestible in a cooking medium, the cooking cycle being a preselected period of time. The circuit includes means for timing the preselected period of time of the cooking cycle and means for providing an indication when a predetermined period of time remains in the cooking cycle. In the preferred embodiment, the means for timing includes first timing means for timing a first portion of the cooking cycle which extends to the predetermined period and second timing means for timing the predetermined period, this predetermined period constituting a second portion of the cooking cycle. The providing means includes a first indication means for indicating that the first portion of the cooking cycle has ended and second indication means for indicating the end of the cooking cycle. Means are also provided for identifying both the end of the first portion and the end of the second portion of the cooking cycle and for effecting operation of the appropriate indication means for indicating those respective events.

DESCRIPTION OF THE PREFERRED EMBODIMENT

Figure 1:
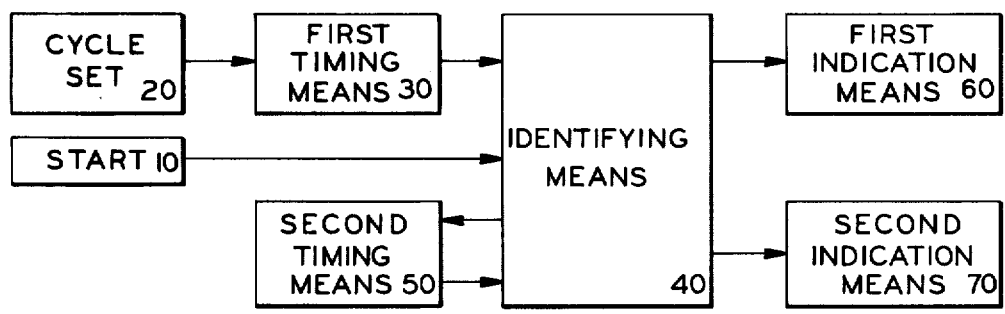
FIG. 1 is a functional block diagram of the cooking cycle timer circuit of the present invention.
Figure 2:
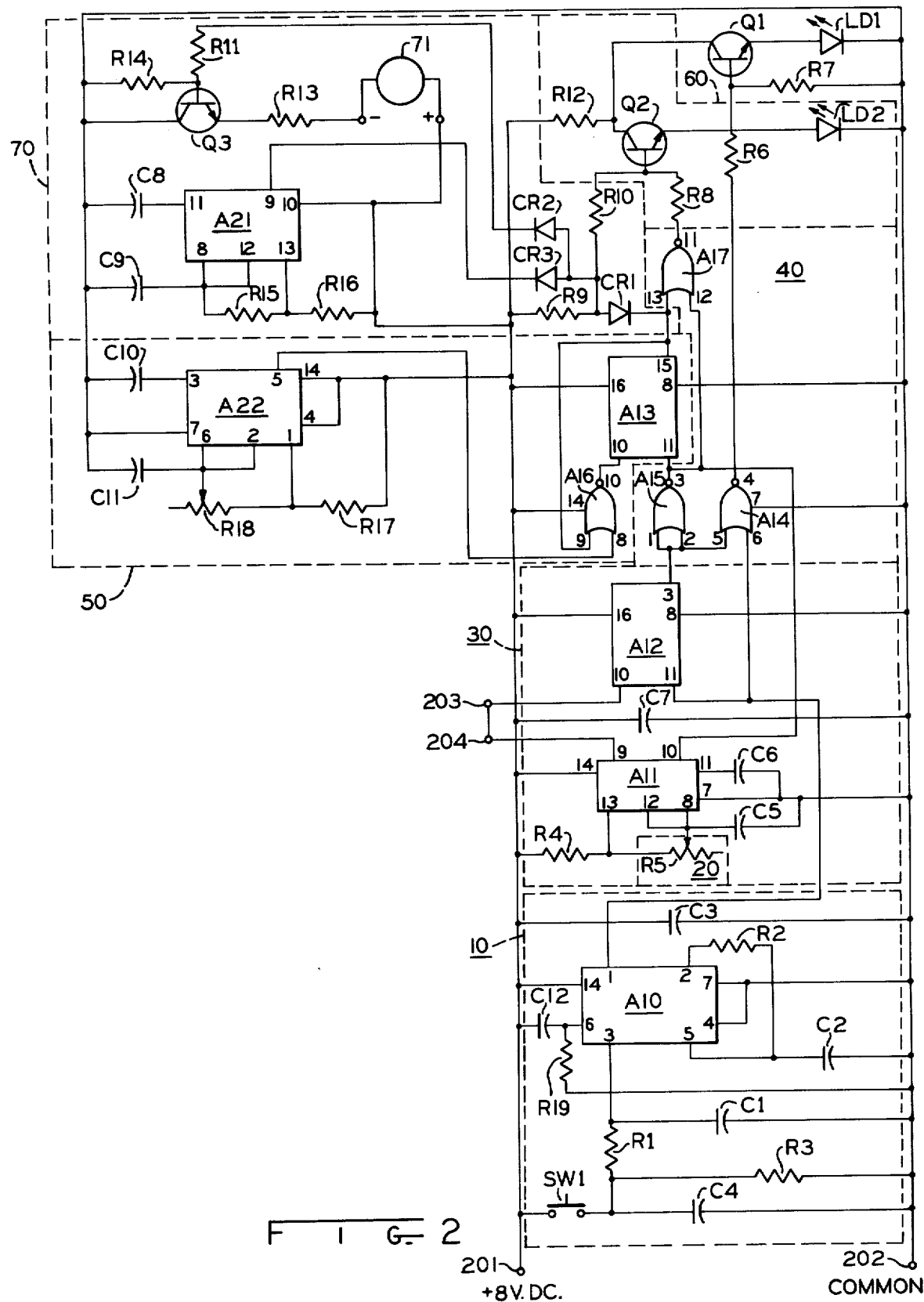
FIG. 2 shows by schematic representation the preferred embodiment of the circuit of the cooking cycle timer of the present invention.

In accordance with the present invention and referring generally now to FIGS. 1 and 2, there is shown the preferred embodiment of the cooking cycle timing circuit of the present invention. A cycle for cooking a comestible in a cooking medium is a preselected period of time and therefore means are provided for timing the preselected period. This includes first and second timing means. Means are also provided for giving an indication to the operator when a predetermined period of time remains in the cooking cycle and includes first and second indication means and means for identifying both the end of first and second portions of the cooking cycle and for effecting operation of the appropriate indication means for indicating those respective events.

Means are provided in the form of terminals 201 and 202 for connection to a source of DC electrical energy. Terminal 202 is circuit common and plus 8 volts DC are applied to terminal 201. To place the timing circuit into operation, switch SW1 in start portion 10 of the circuit is momentarily depressed (closed). The capacitor C1 charges to plus 8 volts through resistor R1. This rising voltage applied to the clock input pin 3 of flip-flop A10 causes the flip-flop to read the $\bar{Q}$ output of pin 2 into the D input of pin 5 to latch the information, the flip-flop complementing its previous state. Capacitor C2 begins to charge through resistor R2 to the new voltage on pin 2 of flip-flop A10. Subsequent closures of switch SW1 will not cause flip-flop A10 to complement itself until capacitor C2 has charged to within approximately two volts of the new $\bar{Q}$ voltage on pin 2 of A10. Resistor R3 provides a control path of discharge for capacitor C1 when switch SW1 is opened. Capacitors C3 and C4 provide a low impedance path for electrical transients which may be present in the plus 8 volt power supply. When power is first applied to the circuit, the set input on pin 6 of flip-flop A10 is caused momentarily to approach plus 8 volts which presets the output on pin 1 of flip-flop A10 to plus 8 volts. This action initializes the start circuit to the inactive state; in other words, the circuit is ready to operate upon depressing the switch SW1.

With plus 8 volts connected across the circuit, first oscillator A11, forming a portion of the first timing means 30, is connected in the astable mode and is free to oscillate. Capacitor C5 is caused to charge toward plus 8 volts through resistors R4 and R5 and caused to discharge through resistor R5. Cycle set 20 is provided including resistor R5 which is variable and manually adjustable and serves as a means for adjusting the period of first oscillator A11 so as to set the duration of the first portion of the cooking cycle.

First timing means 30 also includes first counter A12. With the reset input on pin 11 of first counter A12 held at plus 8 volts, counter A12 is held at the count of zero and does not count the oscillation periods of first oscillator A11. When the reset line is switched to zero volts and mainainted at that voltage, the first timing period, the first portion of the cooking cycle, is initiated and first counter A12 accumulates each period of first oscillator A11. Output Q14 on pin 3 of first counter A12 remains at zero volts from count zero through count 8191. When the count 8192 is reached, Q14, pin 3, switches to and remains at plus 8 volts, indicating the conclusion of the first timing period. At the start of the first timing period, a green, light-emitting diode LD1 is turned on; this LED stays on for the duration of the first timing period. Prior to the initiation of the period, pin 3 of counter A12 is at zero volts and pin 11 of counter A12 is at plus 8 volts. This input condition to pins 5 and 6 of NOR gate A14 causes output pin 4 thereof to be at zero volts. NOR gate A14 forms a part of identifying means 40. During the first timing period, both pin 3 output and pin 11 input of of counter A12 are held at zero volts. This input condition to pins 5 and 6 of NOR gate A14 causes output pin 4 thereof to be at plus 8 volts. The plus 8 volts provides current to the base of transistor Q1 through resistor R6 turning on transistor Q1 and therefore turning on light-emitting diode LD1. Resistor R7 provides a reference to circuit common when transistor Q1 is turned off. When the count from oscillator A11 accumulates to the number 8192, pin 3 output of counter A12 goes from zero to 8 volts. This 8 volts applied to the pin 5 input of NOR gate A14 causes output pin 4 thereof to become zero volts thereby turning off transistor Q1 and light-emitting diode LD1.

At the conclusion of the first timing period, the pin 3 output (Q14) of counter A12 becomes plus 8 volts. Input pins 1 and 2 of NOR gate A15 (also part of identifying means 40) follow the change to plus 8 volts, causing output pin 3 thereof to become zero volts. The zero volts applied to the reset input on pin 11 of second counter A13 causes the counter A13 to go from a reset state and allow it to accumulate periods of second oscillator A22, the oscillator A22 and counter A13 forming a portion of the second timing means 50. Second oscillator A22 begins to oscillate when power is applied to the circuit. Means are provided in the form of a variable resistor R18 for adjusting the period of second oscillator A22 thereby to set the predetermined period or second portion of the cooking cycle. While the count in second counter A13 is between zero and 1023, the pin 15 output (Q11) thereof remains at zero volts. This zero volts is applied to pin 9 input of NOR gate A16 (also forming a portion of second timing means 50) and allows the oscillator periods to pass from the pin 8 input thereof to the pin 10 output in an inverted form. When the count 1024 is reached in counter A13, the pin 15 output thereof goes to plus 8 volts. This plus 8 volts is applied to the pin 9 input of NOR gate A16 and causes the pin 10 output thereof to be maintained at zero volts independent of the voltage at the pin 8 input of the NOR gate A16. When the Q11 output on pin 15 of counter A13 goes from zero to plus 8 volts, the second timing period, the second portion of the cooking cycle, is concluded.

At the beginning of and during the second timing period, first indication means 60 operates to turn on a red, light-emitting diode LD2 forming a part thereof. Prior to the initiation of the second timing period, the reset input on pin 11 of counter A13 is held at plus 8 volts, as described above. The plus 8 volts is applied to the pin 12 input of NOR gate A17 (a portion of identifying means 40) causing the pin 11 output thereof to be held at zero volts independent of the pin 13 input thereof. At the initiation of the second timing period, the reset input on pin 11 of counter A13 is held at zero volts causing the input pin 12 of NOR gate A17 to be held at zero volts, and pin 13 of NOR gate A17 is also at zero volts until the count of 1024 is reached. With pins 12 and 13 at zero volts, output pin 11 of NOR gate A17 is at plus 8 volts. This plus 8 volts provides current through resistor R8 to the base of transistor Q2 turning on Q2 and the red LD2. When the count 1024 is reached, concluding the second timing period, pin 11 of counter A13 switches to plus 8 volts, this voltage being applied to pin 13 of NOR gate A17 and causing output pin 11 of the NOR gate A17 to go to zero volts. This turns off transistor Q2 and the red LED LD2.

At the end of the second timing period, and thereby the end of the cooking cycle, the LED LD2 and an audible indicator 71 (a portion of second indication means 70) are operated in pulsed fashion. Prior to the end of the second period, the Q11 output on pin 15 of counter A13 is maintained at zero volts, causing current to flow from the plus 8 volt supply through resistor R9 and thence through forward biased diode CR1. In this condition, the voltage on the anode of diode CR1 is approximately 0.6 volts. This amount of voltage is insufficient to provide current through resistor R10 to turn on transistor Q2 and light-emitting diode LD2 and insufficient to provide current through resistor R11 to turn on transistor Q3 and the audible indicator 71. At the end of the second period, pin 15 of counter A13 is switched to and maintained at plus 8 volts. Diode CR1 is now reverse biased and current flows from the plus 8 volt supply through resistors R9 and R10 to the base of transistor Q2, turning on the transistor and the light-emitting diode LD2. Current also flows through resistor R9, through forward biased diode CR2 and through resistor R11 to the base of transistor Q3 turning on the transistor and the audible indicator 71. The voltage on the anode of CR1 is also controlled by oscillator A21 through diode CR3. Oscillator A21 forms a portion of second indication means 70 and is connected to operate in the astable mode. It begins to oscillate when plus 8 volts is applied to the circuit. The period of oscillation determines how many times the light-emitting diode LD2 and the audible indicator 71 will be pulsed during a given second. When diode CR1 is reverse biased, voltage on the anode thereof is controlled by diode CR3. Oscillator A21 alternately applied zero and plus 8 volts to the cathode of diode CR3 with each period of oscillation. When diode CR3 is forward biased, insufficient current is available to turn on Red LED LD2 and the audible indicator 71 driver circuits, (including transistors Q2 and Q3) and when diode CR3 is reverse biased, current flows through resistor R9 into the driver circuits thereby turning on the red, light-emitting diode LD2 and the audible indicator 71.

Upon termination of the cooking cycle, the indicators are turned off by momentarily closing switch SW1 causing the flip-flop A10 to complement itself and apply plus 8 volts to the reset input on pin 11 of counter A12.

It is often desirable to modify the duration of a cooking cycle in response to a change in temperature in the cooking medium. A given "doneness" of a comestible can be achieved with different combinations of time and temperature. The cooking control circuit illustrated in FIG. 3 measures the first portion of a cooking time period or cycle, the length of which is a function of the cooking fluid temperature and a "crisp" control setting. The crisp control permits operator selection of the desired degree of doneness for different food products.

Figure 3:
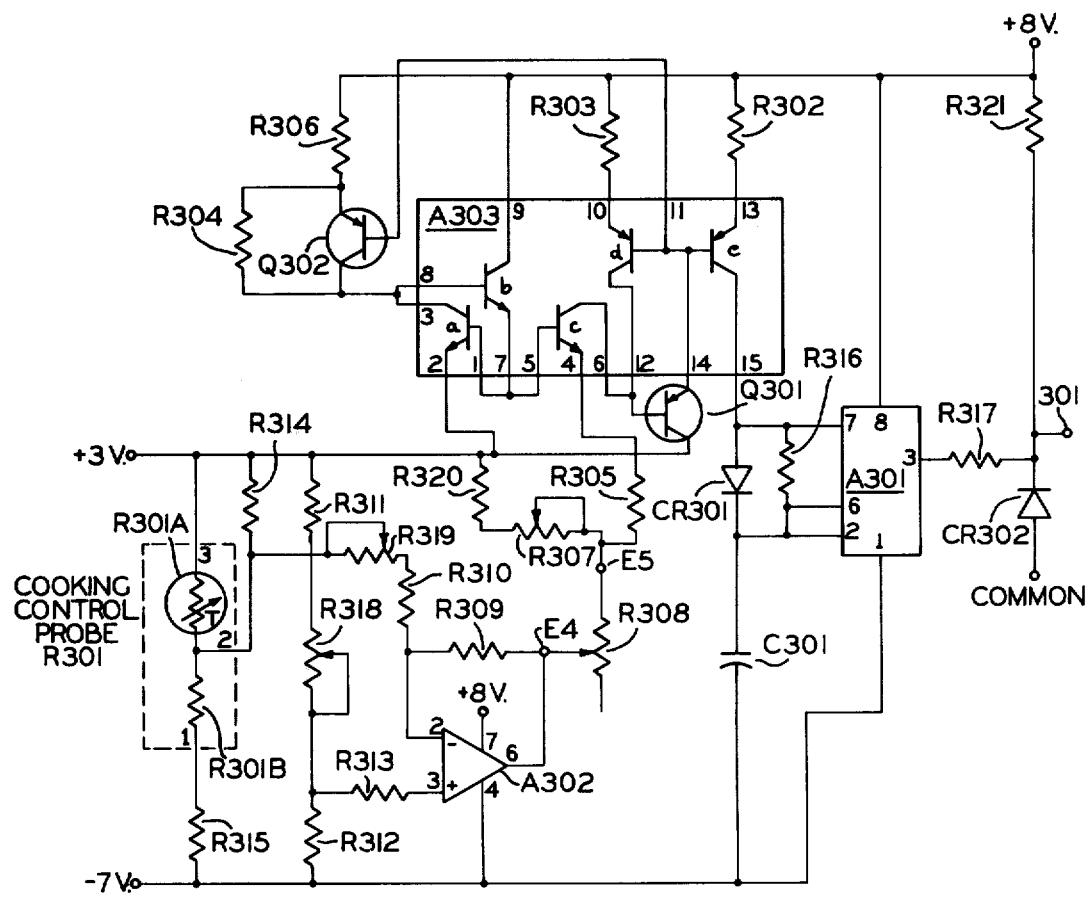
FIG. 3 shows by schematic representation an arrangement for sensing temperature in a cooking medium and for setting the duration of the first portion of the cooking cycle in response thereto.

The cooking control of FIG. 3 provides a series of output pulses which vary in frequency as the cooking fluid temperature varies. These pulses are fed to counter A12 which counts them. To provide the output of FIG. 3 to the timing circuit of FIG. 2, the connection between terminals 203 and 204 of first timing means 30 is broken. Terminal 301 of FIG. 3 is then connected to terminal 203. Appropriate voltages are supplied as shown.

The frequency of the oscillator is a function of both fluid temperature and the "crispness" control setting. As temperature decreases, oscillator frequency decreases in a predetermined manner to yield essentially constant "doneness". The "cripness" control provides a continuously variable multiplier of the temperature dependent oscillator frequency. Thus, the "crispness" control adjusts the base oscillator frequency to match properly a wide range of cooking times for different foods and different degrees of "doneness".

Referring now to FIG. 3, the output of amplifier A302 is a DC voltage measured with respect to the "+3V" bus. This voltage at point E4 consists of a fixed value plus a value that is logarithmically dependent upon the temperature of the thermistor R301A in cooking control probe R301. The probe is immersed in the cooking fluid and its voltage is representative of the cooking fluid temperature. The fixed voltage is developed across resistors R311 and R318. Resistor R318 is adjustable to provide for calibration.

Thermistor R301A is connected in a bridge circuit consisting of resistors R301B, R315, R312, R318, and R311. Bridge unbalance voltage is amplified by A302 and algebraically added to the fixed voltage described above. Resistor R319 is adjustable to provide calibration.

Resistor R314, connected in paralled with thermistor R301A, reduces the sensitivity of the bridge to changes in thermistor temperature. Resistor R301B is a part of the probe assembly and is selected for each probe to compensate for differences in the absolute value of thermistor resistance.

A "crisp" control R308 provides a means for positioning the time/temperature response curve along the time axis. That is, a 3:1 variation in cooking time due to change in cooking fluid temperature can be made to occur over up to a 7:1 range of time by adjustment of the "crisp" control.

An attenuator consists of resistor divider R307, R320 and R308. As the "crisp" control wiper arm is moved along R308, the voltage at terminal E5 is varied due to voltage divider action. Resistor R307 provides a means for calibrating the range of "crisp" control R308.

The voltage at E5 controls the operation of a voltage to current converter which delivers to amplifier A302 a current which is proportional to the voltage at D5. In the exemplification embodiment, the voltage to current conversion is implemented with an integrated circuit A303. In FIG. 3, the individual transistors of the integrated circuit are shown inside the box labeled A303 and are labeled as a, b, c, d and e. In the specification, they are called A303a, A303b, A303c, A303d and A303e.

The operation of the voltage to current converter can be easily understood by assuming:

1. Equal emitter currents in the same type of transistor produce equal base-emitter voltages.
2. Current gain of transistors is relatively high.
3. R302=R303=R306.

A reference voltage is produced by Q302, A303a, A303b and a current mirror is produced by A303d, A303e and Q301. The reference voltage maintains the emitter of A303c at the +3V bus potential. This makes the current through R305 proportional to $V_{E5}$.

Due to circuit symmetry, the collector currents in A303d and A303e equal the collector current in A303c. Transistor Q301 is an emitter-follower which supplies base current for A303d and A303e and has neglibile base current compared to the collector current of A303c.

The reference voltage is generated by forcing transistor A303a to carry the same magnitude of current as A303c. Due to symmetry, A303a and A303c will have the same base-to-emitter voltages. This assures that the emitter of A303c operates at the potential of the +3V bus.

The base of transistor Q302 is connected to the same potential as the base of A303d and, by symmetry, operates at the same collector current as A303c, A303d and A303e. If we momentarily ignore the current through R304, the collector currents of Q302 and A303a are equal. Transistor A303b is an emitter-follower which supplies base current to A303a and A303c and has negligible base current compared to the collector current of Q302.

Circuit operation is predicated upon all transistors being active. This may not be true during startup, so R304 assures that a small current is available to drive the reference circuit and allow the converter to move to the normal operating current set by the current through R305. This starting current has negligible effect on the symmetry between the input current through R305 and the output current.

The output current through pin 15 of IC A303 drives an oscillator circuit. The oscillator circuit is of the relaxation type and may be implemented using an integrated circuit oscillator A301. The voltage across integrating capacitor C301 varies between two values of voltage identified as $V_{max}$ and $V_{min}$. These voltages are fixed fractions of the power supply voltage applied to the integrated circuit A301. Capacitor C301 charges from the current received from transistor A303e. When the voltage across C301 reaches the level $V_{max}$, the IC oscillator A301 causes capacitor C301 to discharge through resistor R316. When the voltage across C301 reaches $V_{min}$, the IC oscillator allows the capacitor to charge again. The period of oscillation of the oscillator circuit consists of two time intervals, one fixed and one variable. The fixed time interval is proportional to the R316, C301 product. This pulse width is then separated by an adjustable or variable time interval inversely proportional to the current from the voltage to current converter. In actual practice, the adjustable time interval is large compared with the fixed time interval, and thus, the period of time is inversely proportional to the current. The current, in turn, is responsive to the temperature of thermistor R301A.

The circuit of FIG. 3 in effect operates to time the first portion of the cooking cycle and replaces in a sense, first oscillator A11 of first timing means 30 and first period setting resistor R5. Operation of the circuit of FIG. 2 continues as described above.

The exemplification embodiment of the cooking cycle timer shown in FIG. 2 has been constructed and has operated satisfactorily with components having the following values and designations:

| Resistor | R1 | 2.7K ohm ¼ W., 5%, Carbon comp. |
|---|---|---|
| " | R2 | 22M ohm, ¼ W., 5%, Carbon comp. |
| " | R3, R7, R16 | 33K ohm, ¼ W., 5%, Carbon comp. |
| " | R4 | 5.1K ohm, ¼ W., 5%, Carbon comp. |
| " | R6, R8 | 20K ohm, ¼ W., 5%, Carbon comp. |

-continued

|  |  |  |
|---|---|---|
| " | R9 | 8.2K ohm, ¼ W., 5%, Carbon comp. |
| " | R10 | 13K ohm, ¼ W., 5%, Carbon comp. |
| " | R11, R14 | 56K ohm ¼ W., 5%, Carbon comp. |
| " | R13 | 680 ohm, ¼ W., 5%, Carbon comp. |
| " | R15 | 560K ohm, ¼ W., 5%, Carbon comp. |
| " | R17 | 82.5K ohm, ¼ W., 5%, Carbon comp. |
| " | R19 | 100K ohm, ¼ W., 5%, Carbon comp. |
| " | R12 | 510 ohm, ½ W., 5%, Carbon comp. |
| " | R5 | 200k ohm, vrbl. |
| " | R18 | 50K ohm, vrbl. |
| Capacitor | C1, C4 | 0.001 MFD, 50V DC, ceramic |
| " | C2 | 0.1 MFD, 50V DC, ceramic |
| " | C3,C6, C7,C8, C10,C12 | 0.1 MFD, 50V DC, ceramic |
| " | C5, C9, C11 | 0.33 MFD, 100V DC, metallized polycarbonate |
| Transistor | Q1, Q2, Q3 | GE 2N5818, NPN |
| Diodes | CR1, CR2, CR3 | GE DA 1702 |
| Flip-flop | A10 | ¼ RCA, CD4013, D-type |
| Oscillator | A11, A21, A22 | Signetics NE 556 Dual, ½ each |
| Counter | A12, A13 | RCA CD4020, Binary, 14 Bit |
| NOR gate | A14, A15, A16, A17 | RCA CD 4001-Quad, ¼ each |
| LED | LD1 | Monsanto MV5253, Green |
|  | LD2 | T.I. TIL 220, Red |
| Audible Indicator | 71 | Mallory SNP428 - Sonalert |

The exemplification embodiment of the control shown in FIG. 3 has also been constructed and has operated satisfactorily with components having the following values and designations:

|  |  |  |
|---|---|---|
| Thermistor | R301A | 100K ohm ± 5% Nominal @ 25° C. Beta @ 25° C. = 3966° K. ± 1.4% |
| Resistors | R301B | Chosen to match Thermistor R301A |
| " | R302, R303, R306 | 162K ohm, 0.1W, 1% |
| " | R304 | 22M ohm, ¼ W, 5% |
| " | R305 | 365K ohm, 0.1W, 1% |
| " | R307 | 1K ohm, vrbl; Bourns 3386 W-1-102 |
| " | R308 | 50K ohm, vrbl. |
| " | R309 | 549K ohm, 0.1W., 1% |
| " | R310 | 39.2K ohm, |
| " | R311 | 649 ohm, |
| " | R312 | 4020 ohm, |
| " | R313, R317 | 51K ohm, ¼ W, 5% |
| " | R315 | 4120 ohm, |
| " | R316 | 187K ohm, |
| " | R318 | 50 ohm, vrbl; Bourns 3386LJ-1-500 |
| " | R319 | 20K ohm, vrbl; Bourns 3386W-1-203 |
| " | R320 | 4420 ohm, 0.1W., 1% |
| " | R321 | 100K ohm, ¼ W., 5% |
| Capacitor | C301 | 1 MFD, 100V |
| Diodes | CR301, CR302 | GE DA 1702 |
| Transistors | Q301, Q302 | Fairchild 2N5086-18 |
| Integrated Circuit | A301 | Signetics NE 555V |
| " | A302 | RCA CA 741 CE |
| " | A303 | RCA CA 3096 AE |

It should be apparent to those skilled in the art that, while we have described what we presently consider to be the preferred embodiment of our invention, in accordance with the Patent Statutes, changes may be made in the disclosed forms of the embodiment without actually departing from the true spirit and scope of the invention.

What is claimed is:

1. An electrical circuit for timing a cycle for cooking a comestible in a cooking medium, the cooking cycle being a preselected period of time and including a first portion and a second portion, the circuit comprising:
   means for connecting the circuit to a source of DC electrical energy;
   means for manually effecting turn-on of the circuit;
   means including a first light-emitting diode for providing an indication that the circuit is turned-on and the cooking cycle is under way;
   first timing means for timing the first portion of the cooking cycle, the first timing means including a first oscillator, means for adjusting the period of the oscillator to set the duration of the first portion, and a first counter for accumulating a predetermined number of oscillations from the first oscillator;
   second timing means for timing the second portion of the cooking cycle, the second timing means including a second oscillator, means for adjusting the period of the second oscillator to set the duration of the second portion, a second counter for accumulating a predetermined number of oscillations from the second oscillator, and a NOR gate for precluding accumulation of oscillations from the second oscillator when the predetermined number is reached;
   means including a second light-emitting diode and a transistor driver therefor for indicating the end of the first portion of the cooking cycle;
   means for indicating the end of the second portion and thereby the cooking cycle including an audible indicator, a transistor driver therefor and a third oscillator for effecting pulsing operation of the audible indicator and the second light emitting diode; and
   means for identifying both the end of the first portion and the end of the second portion of the cooking cycle and for effecting operation of the appropriate indication means for indicating the respective events, the identifying means including a second NOR gate for detecting the end of the first portion of the cooking cycle to allow turn-on of the second light-emitting diode, a third NOR gate for detecting the end of the second portion of the cooking cycle, and three signal diodes for effecting operation of the third oscillator.

2. The electrical circuit of claim 1 wherein means are provided for modifying the duration of the first portion of the cooking cycle in response to a sensed change of temperature in the cooking medium.

* * * * *